(12) United States Patent
Williams

(10) Patent No.: US 9,340,243 B2
(45) Date of Patent: May 17, 2016

(54) MODULAR STRUCTURE AND METHOD OF CREATING MODULAR STRUCTURES

(71) Applicant: Marty Williams, Colorado Springs, CO (US)

(72) Inventor: Marty Williams, Colorado Springs, CO (US)

(*) Notice: Subject to any disclaimer, the term of this patent is extended or adjusted under 35 U.S.C. 154(b) by 0 days.

(21) Appl. No.: 13/727,388

(22) Filed: Dec. 26, 2012

(65) Prior Publication Data

US 2014/0174009 A1 Jun. 26, 2014

Related U.S. Application Data

(60) Provisional application No. 61/578,886, filed on Dec. 22, 2011.

(51) Int. Cl.
| | |
|---|---|
| E04C 2/52 | (2006.01) |
| B62D 63/00 | (2006.01) |
| E04H 7/00 | (2006.01) |
| E04H 14/00 | (2006.01) |

(52) U.S. Cl.
CPC ........ B62D 63/00 (2013.01); E04H 7/00 (2013.01); E04H 14/00 (2013.01)

(58) Field of Classification Search
CPC .......... E04B 1/3211; E04B 7/102; E04B 2001/3276; E04B 1/32; E04B 2002/0265; E04B 2001/3282; E04B 1/34378; E04H 15/36; E04C 2/328; E04C 2/322; E04C 2/08

USPC ............... 52/220.4, 79.1, 79.9, 79.11, 79.13, 52/80.1, 80.2, 79.5, 79.6, 79.7, 271, 285.4
See application file for complete search history.

(56) References Cited

U.S. PATENT DOCUMENTS

| | | | | | |
|---|---|---|---|---|---|
| 3,902,288 | A | * | 9/1975 | Knudson | 52/86 |
| 3,909,995 | A | * | 10/1975 | Bainter et al. | 52/79.1 |
| 8,220,220 | B2 | * | 7/2012 | Kim et al. | 52/745.07 |
| 8,365,483 | B2 | * | 2/2013 | Hijazi | 52/245 |
| 8,418,424 | B2 | * | 4/2013 | Davis et al. | 52/630 |
| 8,429,858 | B1 | * | 4/2013 | Robinson et al. | 52/79.5 |
| 2004/0074206 | A1 | * | 4/2004 | Tanase et al. | 52/783.17 |
| 2004/0123529 | A1 | * | 7/2004 | Wiese et al. | 52/6 |
| 2009/0285652 | A1 | * | 11/2009 | Williams | 411/172 |
| 2010/0126093 | A1 | * | 5/2010 | Davis et al. | 52/283 |
| 2010/0146789 | A1 | * | 6/2010 | Anderson et al. | 29/897.32 |
| 2011/0067321 | A1 | * | 3/2011 | Hijazi | 52/79.1 |
| 2012/0073215 | A1 | * | 3/2012 | Zhang et al. | 52/79.9 |
| 2013/0227896 | A1 | * | 9/2013 | Anderson et al. | 52/86 |
| 2014/0083023 | A1 | * | 3/2014 | King et al. | 52/79.1 |

* cited by examiner

*Primary Examiner* — Brian Glessner
*Assistant Examiner* — Gisele Ford
(74) *Attorney, Agent, or Firm* — Tracy M. Heims; Apex Juris, pllc

(57) ABSTRACT

A modular structure and method of creating a modular structure where the structure has a cover made from a corrugated, lightweight material, at least one end wall and at least one corner connection means where the cover has at least one channel cut therein and where the end wall is inserted into the channel so that the cover wraps around the end wall to form a structure, and where at least one corner connection means connects and secures the cover to the end wall.

19 Claims, 22 Drawing Sheets

MODULAR STRUCTURE AND METHOD OF CREATING MODULAR STRUCTURES

REFERENCE TO PRIOR APPLICATION

The present invention claims priority to previously filed Provisional Application No. 61/578,886, filed 2012 Dec. 22.

BACKGROUND OF INVENTION

1. Field of the Invention

The present invention addresses a new cover structure and design, that is useable for a variety of purposes, that is lightweight, that is easy to assemble and is shippable in compacted form. The present invention also addresses the method of creating these structures.

2. Description of the Related Art

The present application has a variety of possible uses and the following are just a few. It should be noted that the invention is not limited to these specific examples but can be used for multiple purposes.

Conventional pickup truck and trailer covers, containers and structures are typically built out of heavy, rigid construction materials and are bulky, difficult to ship and if designed to be knocked down, generally have complicated assembly processes utilizing a multitude of parts and fasteners. The present invention permits a large cover, container or structure to be created with as few as three parts including one cover, two matching arched end walls, or end walls, and a connector or fastener. This extremely simple, elegant design allows for this assembly to be shipped in a highly compact form due to the unique folding and rolling ability of the material used in the invention and the limited number of parts required for construction.

Additionally, portable, modular structures are becoming popular as temporary or semi-permanent storage facilities. Often it is desirable to store equipment, vehicles or other items in places where no permanent storage is available. However, most of these temporary structures are complex and not easily set up.

Another area where compact shippable containers are needed is for additional cargo space needed with cars, SUV's, RV's and vehicles in general. The ability of an enclosed container to be knocked down and shipped in a highly compacted form provides great value by reducing the shipping cost to customers. The ability to use UPS® or FEDEX® package delivery or any other economical package delivery service for a product instead of using an LTL Freight carrier for delivery not only saves the customer money, but greatly reduces the risk of shipping damage.

There presently is a need for a modular structure that may be configured in many different shapes and sizes and for many different purposes that is lightweight, easy to assemble and that knocks down for shipping and storage. The present disclosure has been made with the view to such problems, and an object of the present invention is to provide a light-weight, versatile, multi-sizeable, multi-configurable and collapsible modular structure that is easily assembled.

SUMMARY OF THE INVENTION

To solve the above problems and to achieve the object noted above, the present disclosure is configured as follows.

The structure of the present invention utilizes a corrugated, semi-rigid sheet material having two outside surfaces connected by intermediate ribs. In its originally fabricated form this material is flat and non-pliable. However, with specific single surface and rib material removed and channels created the sheet is transformed into a flexible material that permits formation of complex radial geometries. These radial geometries cause the sheet to exhibit both compression forces on the cut side of the material surface and tension forces on the uncut surface when the sheet is formed into radial shapes. The gaps or channels resulting from the single surface material removal are closed by the hinging affect of the uncut side, causing the remaining blocks to occlude. The occlusion of the cut surface causes the uncut surface to be tensioned.

By removing material and allowing the formerly two dimensional sheet to be formed into three dimensional radial shapes, the sheet's resistance to deflection is increased due to the ability of the formerly semi-rigid sheet to have a "crown" shape. The radial shape is determined by the span and arc of the design and the amount of material removed from the desired arc. For a shallow arc the material removed is a thin strip, or thin channel. As more material is removed in wider strips, the sheet can be formed into shorter radius arcs.

Although numerous types of sheet can be used to create this novel mechanical property and its resulting designs, the description of the present invention will focus on the use of corrugated polypropylene sheet, as this material is readily available on the market and is used extensively for signs. This is not to narrowly define the material choices for the present invention, as many substitute materials can also be used to accomplish the novelty of the present invention. The invention's cross sectional appearance is for a material having two lateral surfaces joined by intermediate ribs/flutes/connecting the lateral orientation of the surface composition.

The choice of polypropylene (PP) as the substrate for the sheet is specific to several unique characteristics of PP, including but not limited to the following: thin, single wall sections of this material possessing a hinging ability without cracking or losing strength; the ability of the material to be colored; the ability of the material to accept adhesive stickers; the ability of the material to have insulate value due to trapped air between the two surfaces; the ability of the material to have its translucency varied; and the ability of the material to maintain its structure and competency in extreme temperatures, even when hinged numerous times.

The selection of the corrugated profile is important for the rigidity of the material, and for the ability to have wiring, lighting and heating elements placed or configured inside the cells that run along one dimension of the corrugated sheet.

One structural embodiment is an enclosed box without floor. This embodiment consists of a roof panel and two end walls, or end walls. The end walls are designed with a radial top surface and a straight bottom surface. The roof panel fits over the end walls with a tongue and groove connection created by the removal of the surface and center ribs of the formerly rigid sheet to provide a channel in the panel into which the end wall can lock. By removing strips of the surface skin from the inside of the panel, the formerly rigid panel is allowed to wrap itself around the upper edges of the end walls, lock itself onto the top of the end wall and self tension the resulting structure. The roof panel has material strips removed on the inside surface for the full length of the sheet. This allows the roof sheet to conform flexibly onto the end walls in a secure manner. The removal of periodic strips from only one surface of the roof panel creates defined channels and allows this embodiment of the roof panel to be rolled or folded to provide compact shipping and storage. Additionally, the end walls can have material removed from one surface to provide this same folding or rolling ability for compact shipping and storage, yet assemble rigidly in conjunction with the roof or cover panel.

The four corners of this embodiment utilize secure mechanical connections or fasteners for the roof panel to the end walls by way of connection media including preferred embodiments such as hook and loop (Velcro®), Pin & Barrel Nut hardware (Pin Nut™), as described in U.S. patent application Ser. No. 12/122,546, incorporated in its entirety by this reference, and self assembling spring buttons that allow for a no-tool setup and takedown. It should be noted that the connection means are not limited by this description and that any fastener or connection means may be utilized to connect the parts together.

This embodiment can also stand on its end, to provide, among other applications, a novel point of purchase display, shelving and cabinet functions. This embodiment can have a plurality of end walls that are distally separated in height through the creation of grooves or channels caused by material being removed from the inside of the cover so that additional shelving ledges may be provided. It should be noted that one key unique aspect of this design is that functionality is created by the removal of material from the cover, a unique process and technique that provides new value compared to other processes that require adding parts to accomplish these functions. Additionally, this stand up embodiment can have the cover sheet extended with material removed at decisive places for hinging so that the cover sheet also functions as a door or doors to fully enclose the structure, without adding parts. This embodiment is permitted by the inherent hinging ability of the thin PP wall that remains after removal of the opposite side skin and intervening flutes. This embodiment eliminates the cost and complexity of providing hinged doors using conventional methods.

Another preferred embodiment of the present invention is to have the structure include a floor that can be organically attached to the roof panel, or function as a part of the structure that attaches to the roof and end walls separately during assembly.

These two embodiments can be iterated in multiple applications and in many sizes to match with new product choices in widely disparate market niches including housing, storage, transportation, point of sale displays, agricultural and automotive products, examples of which can be seen in the attached art.

DETAILED DESCRIPTION OF THE PREFERRED EMBODIMENTS

Figure 1:
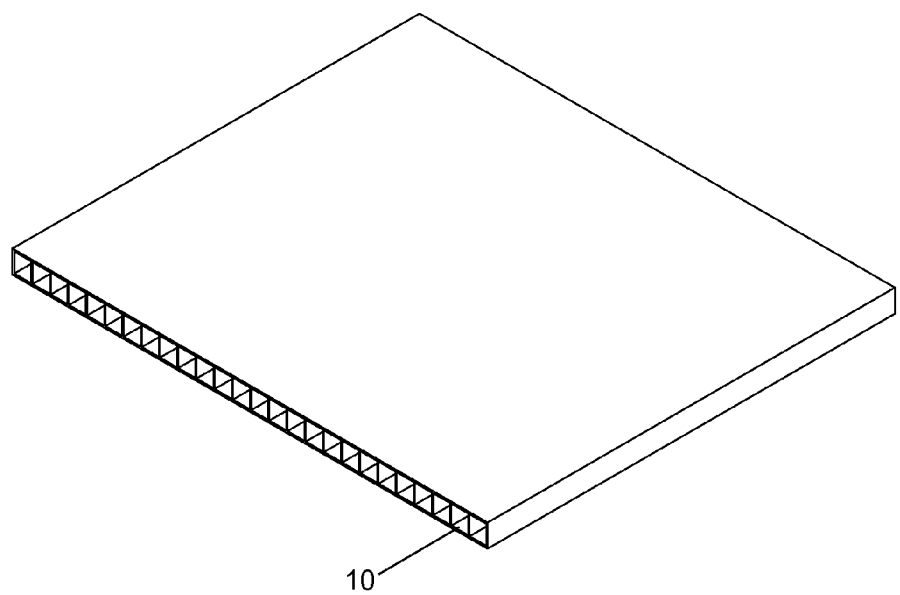
FIG. 1 is an elevated view of the cellular sheet used to create one of the many forms possible.

Referring now to the structure in more detail, in FIG. 1 there is shown a blank of the raw material used to create an arch structure showing the cellular structure 10 of the sheet.

Figure 2:
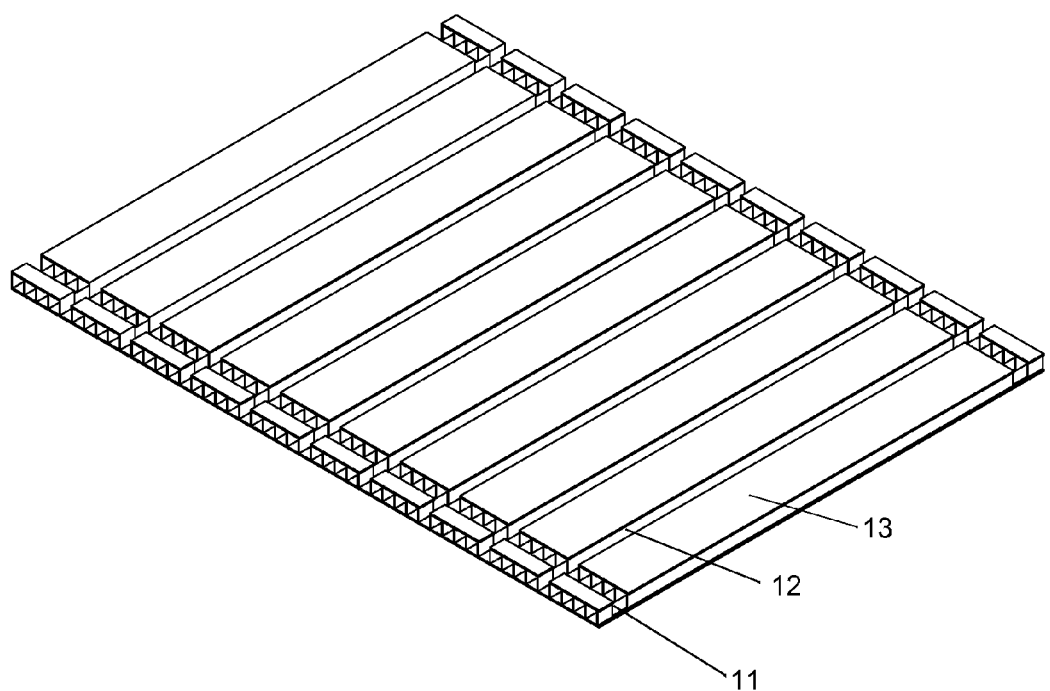
FIG. 2 shows the cellular sheet for the cover of one of the forms possible with material removed to allow the sheet to fold and form radius shapes.

In FIG. 2 the sheet is shown with the material removed 12 and creating channels 11 to allow the formerly rigid sheet to roll and the material removed 11 to create an engagement point for the end walls to fit.

Figure 3:
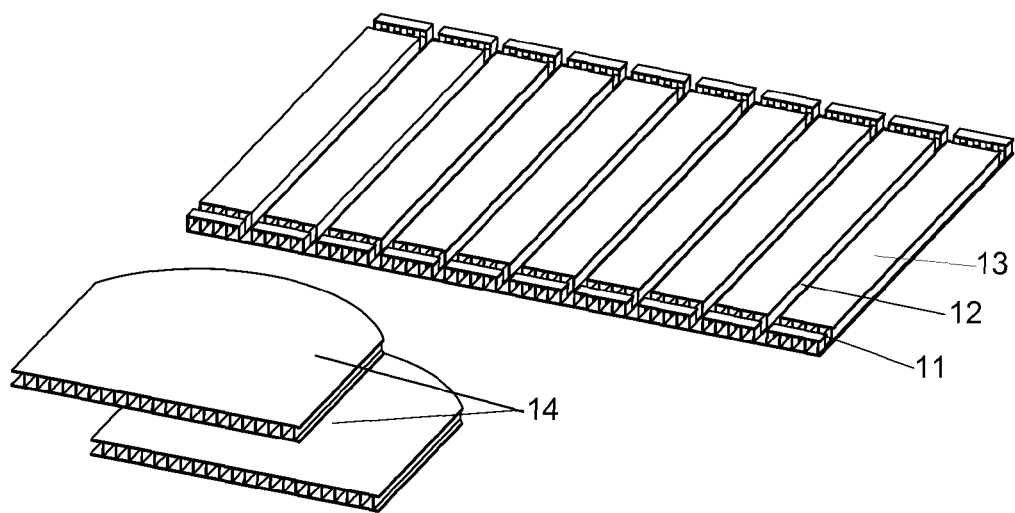
FIG. 3 is an elevated view that shows the cover and end walls necessary to form the arch design.

FIG. 3 shows the invention complete and ready to assemble with the cover 13 and the end walls 14 in perspective view.

Figure 4:
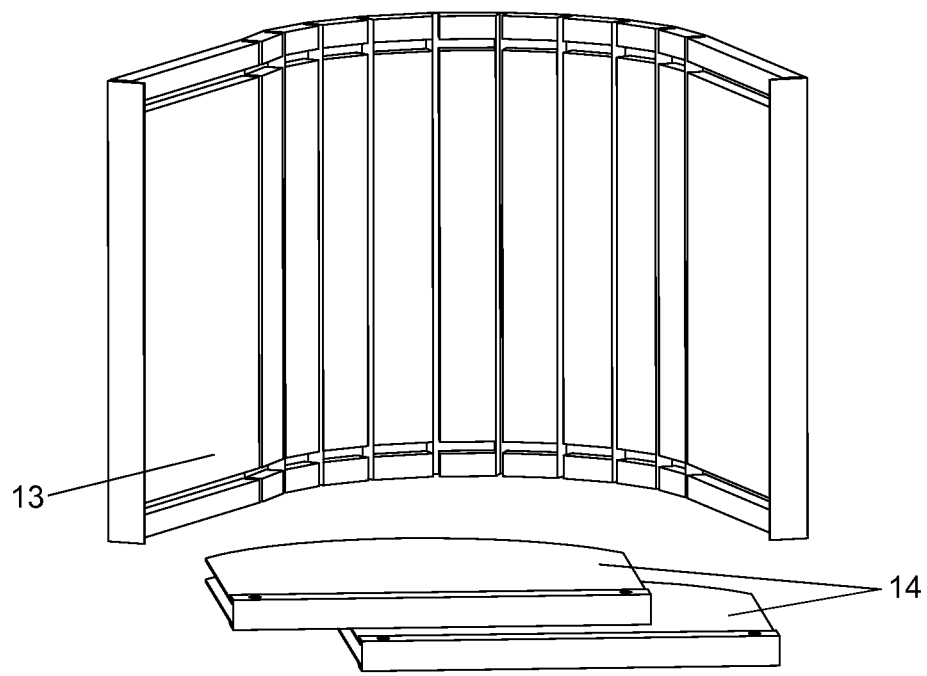
FIG. 4 is an exploded view of the arch design that shows the cover and end walls ready for assembly.

FIG. 4 shows the preferred assembly method where by the cover 13 is ready to have the end walls 14 inserted into the channel 11 at each end of the cover.

Figure 5:
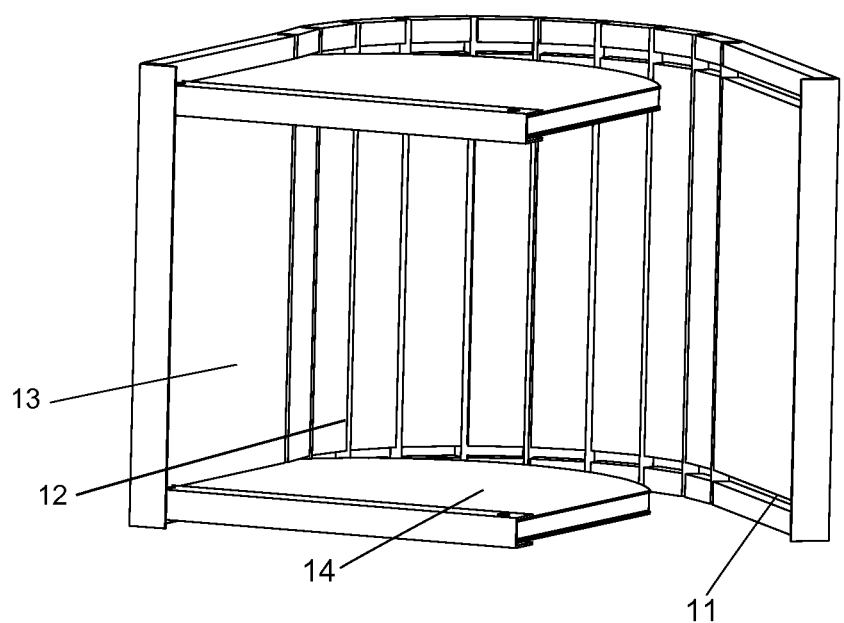
FIG. 5 is another exploded view of the arch design that shows the process of assembly.
Figure 6:
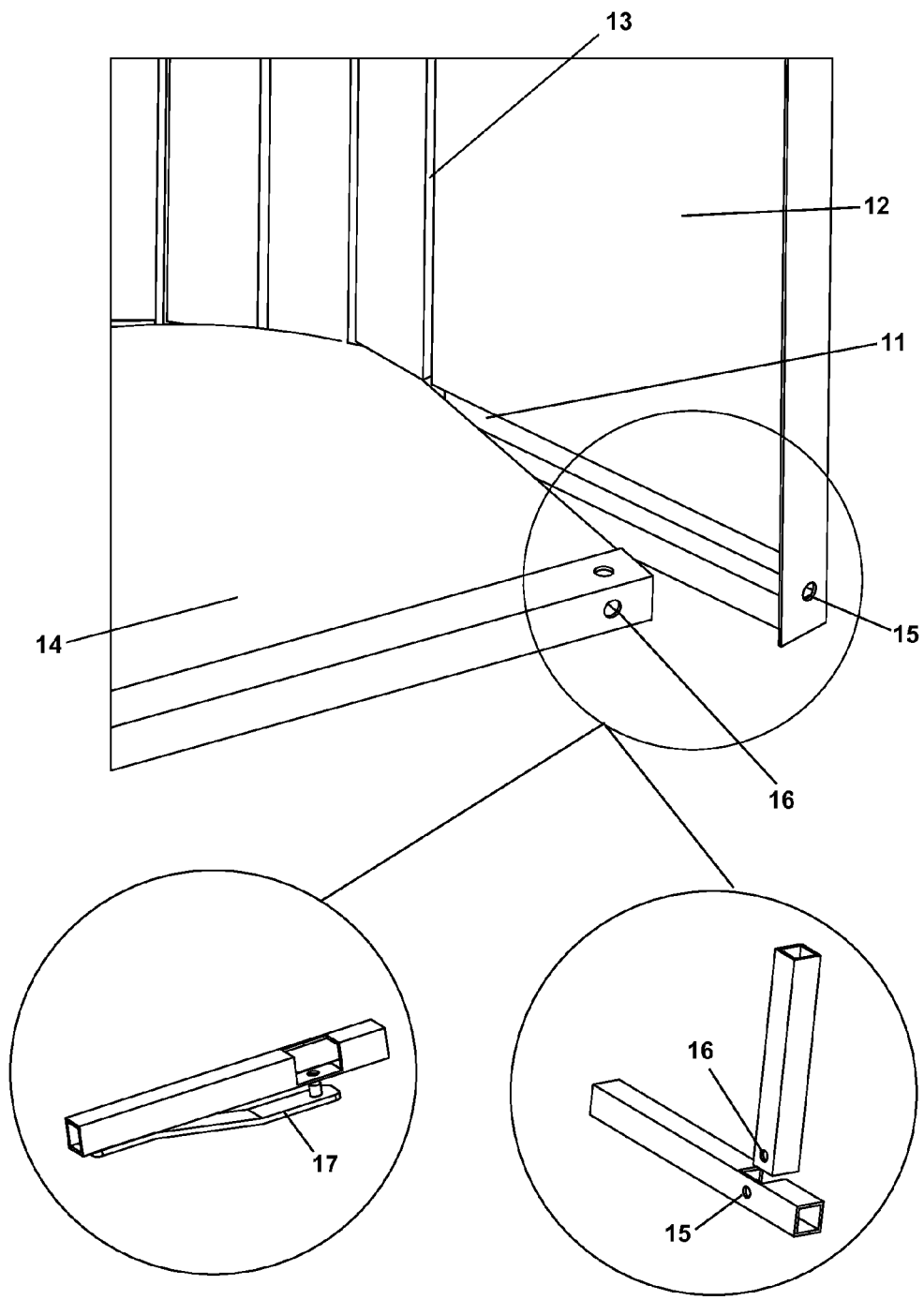
FIG. 6 is an exploded view of a securing system used to secure the end walls to the cover to form the arch structure with an open floor.

FIG. 5 shows the preferred enclosure partially assembled with the cover 13 adopting the shape of the end wall 14 by way of the end wall 14 fitting into the cover channel 11. In FIG. 6 an example of the corner connection is shown whereby the end wall 14 and cover 13 have a metal channel cap 16 so that when the end wall 14 inserts into the cover channel 11, a pin or spring button 17 engages through both the bulk head 16 and cover channel hole 15 to positively lock the corner together to form the radial shape.

Figure 7:
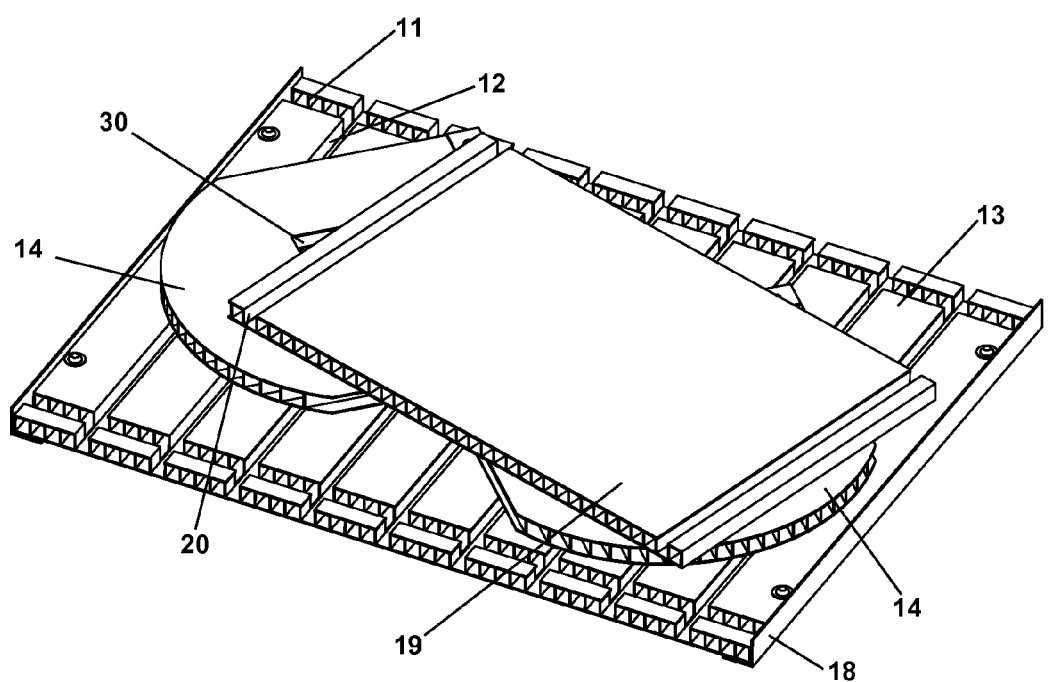
FIG. 7 is an elevated view of the cellular sheet laid flat with provision for an integrated floor.
Figure 8:
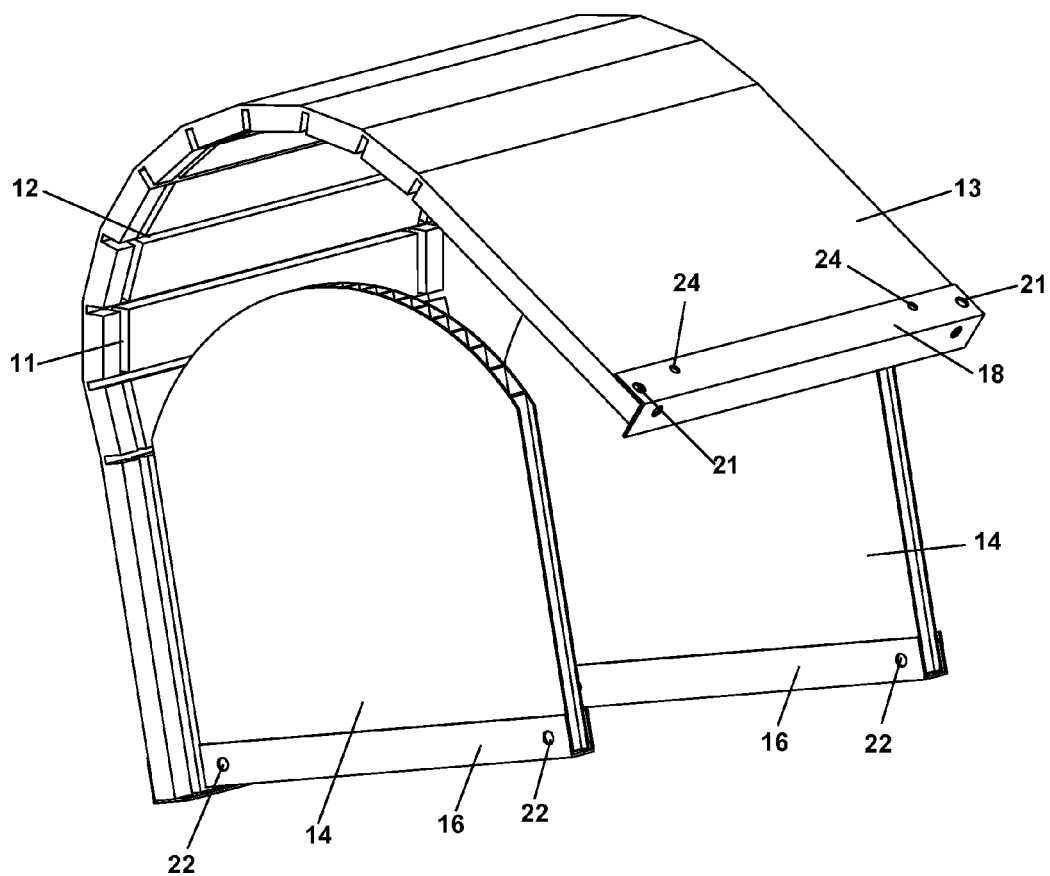
FIG. 8 is an elevated, exploded view of the arch design without floor

FIG. 7 shows a version of the structure dissembled with the cover 13 and floor 19 having a common recess 20, 11 into which the end walls 14 engage. By removing intermediate strips of material from the inside surface of the cover 12, the formerly rigid flat sheet 10 can now form itself to the radius of the end walls 14 and lock in place. Further, this embodiment shows a hinged door 30 in the end wall 14 that is created by completely removing material on the bottom and two sides of the door, but only removing the inside surface and center ribs from the material at the top of the door 30, thereby allowing the door 30 to hinge on the outside material surface. The cover 13 in this embodiment has angle 18 attached to the longitudinal edge of the cover. FIG. 8 shows the cover 13 with angle 18 about to wrap around the end walls 14 on an enclosure without floor.

Figure 9:
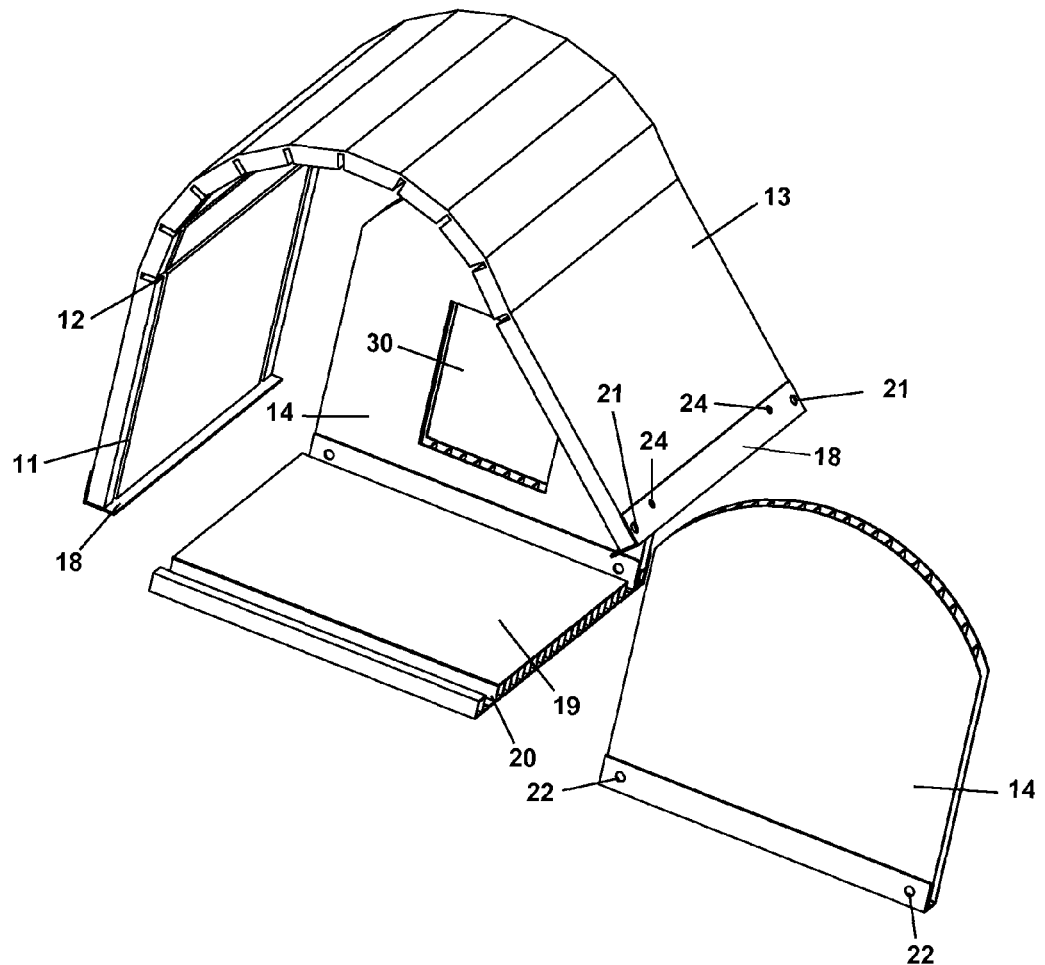
FIG. 9 is an exploded view of arch design with floor.

FIG. 9 shows the structure shown in FIG. 8 with the addition of the floor 19. The channel 16 at the bottom of the end wall 14 fits in the floor groove 20 and the cover groove 11 so that when assembled threaded fasteners can fit though the angle 18 in holes 21 in each of the four corners to securely lock the assembly together with the floor 19 fits between the angle 18 and the bottom of the cover wrap 13 and cover angle 18.

Figure 10:
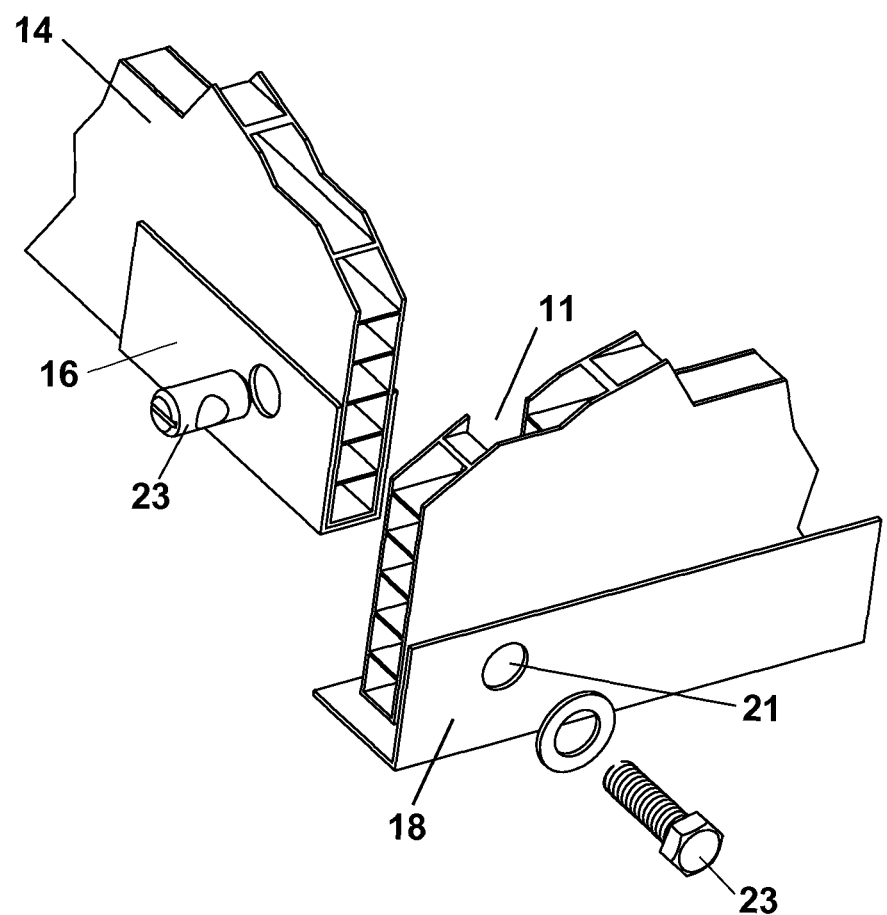
FIG. 10 shows a preferred method for securing the corners of arch structure.

FIG. 10 shows the corner connection in detail with the end wall 14 channel 16 having a fastener, and specifically a Pin Nut™ 22, that is engaged by a fastener 23 threading through the cover angle 18 and thereby drawing the cover 11 securely onto the end wall 14 with the end wall channel 16 fitting on top of the cover angle 18. A Pin Nut™ is a connector as disclosed in U.S. patent application Ser. No. 12/122,543. Specifically, it is a fastener assembly for securing two components to one another, where the fastener assembly has a pin for insertion into a hole formed in a first component; a reduced diametrical portion on one end of the pin forming a shoulder on the pin where the shoulder engages with an outer wall of said first component and where another end of said pin engages with another outer wall of said first component; a radially extending threaded hole formed in said pin; an elongated fastener having a head portion and a threaded portion where the fastener is inserted through at least one hole in the second component and where the threaded portion is inserted and threadedly received into the radially extending threaded hole in the pin to engage and secure the first component to the second component such that when the fastener is tightened into the threaded portion of the pin, the reduced diametrical portion contacts with the outer wall and the another end of the pin contacts with the another outer wall causing the pin to be seated in a slightly cocked position resulting in thread lock between the fastener and the threaded portion of the pin. Pin Nut™ vis-à-vis HexWerx™ is a corner connector that threadably engages the cover wrap and the end wall in a secure connection.

Figure 11:
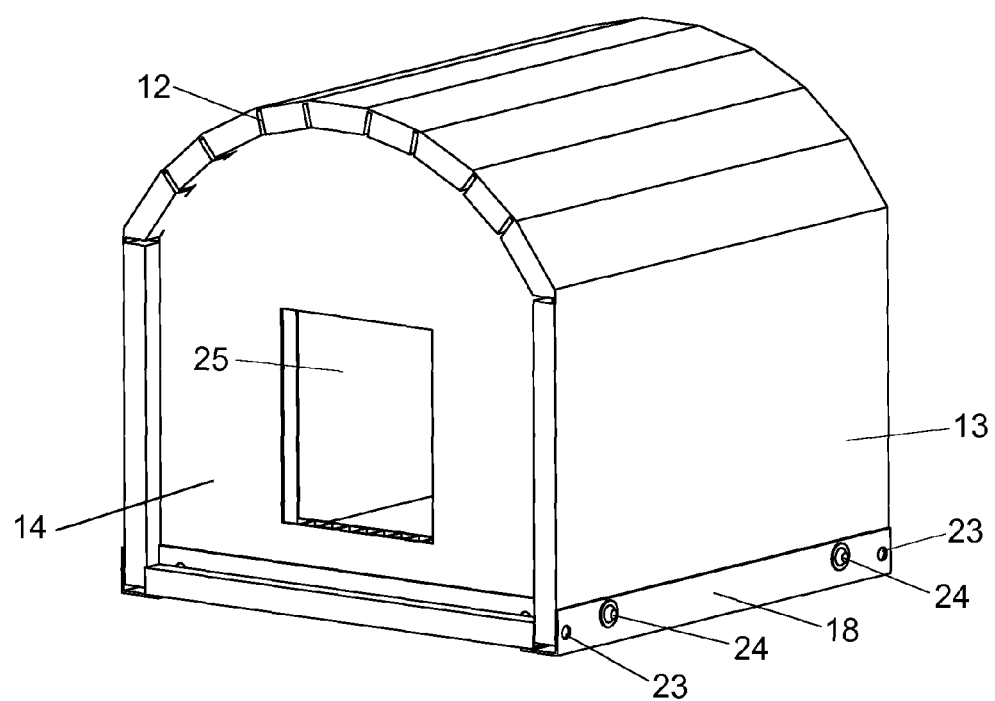
FIG. 11 is an elevated view of the arch design with floor and hinging door assembled.

FIG. 11 shows one embodiment of the invention assembled with the hinged door 30 integrated into the end wall 14 as one continuous piece. The construction details of the invention as shown in FIG. 10 and FIG. 11 are such that the flexible cover as wrapped around the end walls and floor transforms the previously flexible cover and components 19, 14 and 13 into a rigid structure that is more resistant to deformation than the individual parts, is lightweight and is exceedingly easy to assemble and disassemble.

Figure 12:
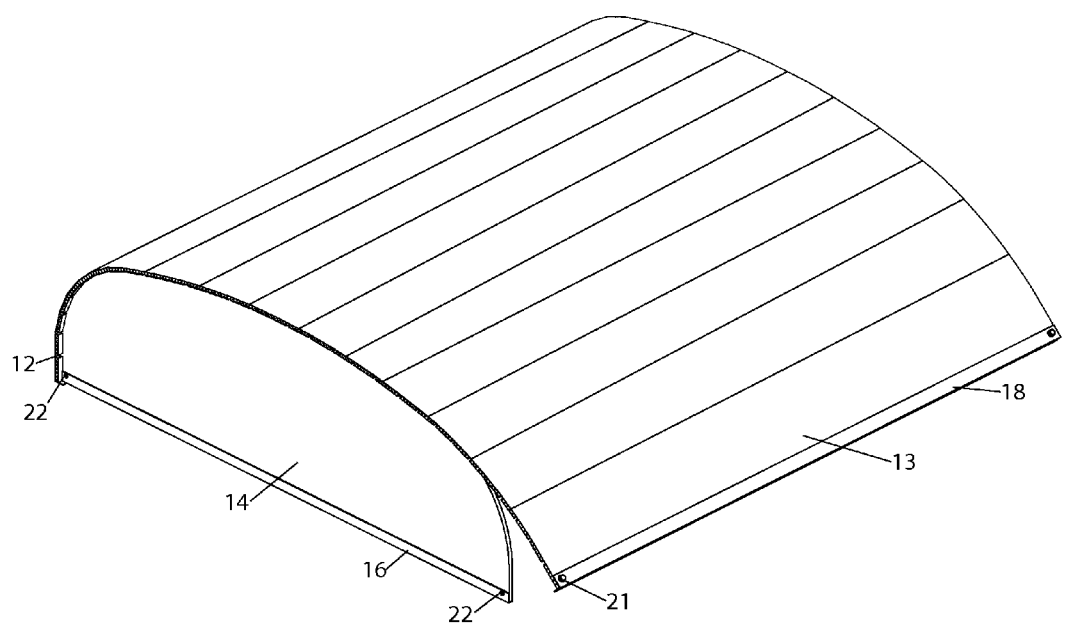
FIG. 12 is an rendered as a pickup or trailer cover in partial assembly.
Figure 13:
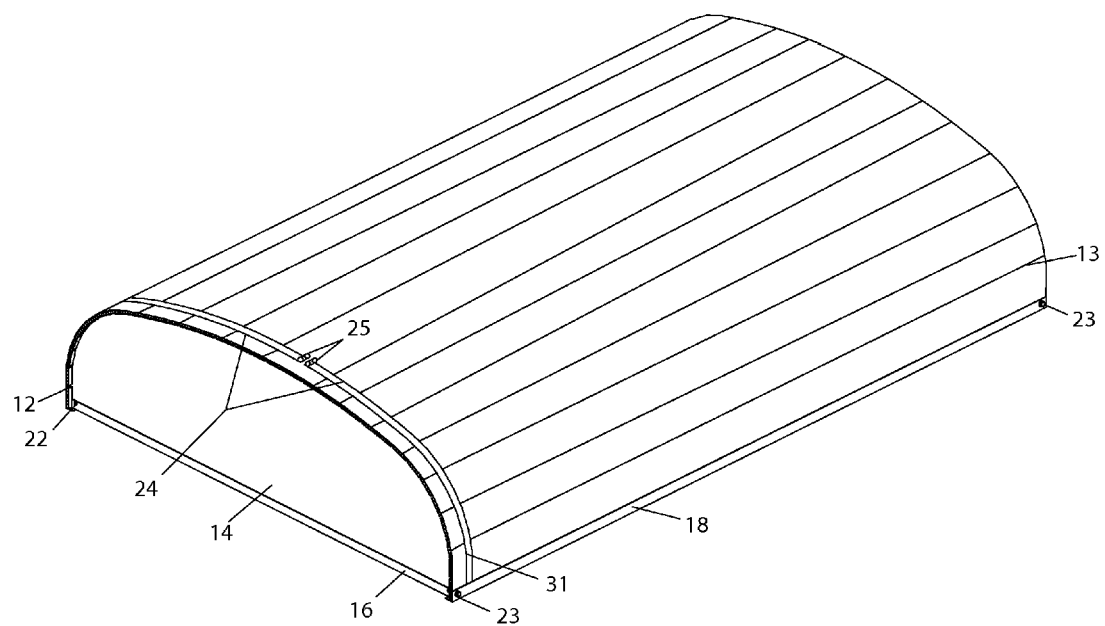
FIG. 13 is a side view of the pickup cover assembled with end wall/cover retaining bands installed.
Figure 14:
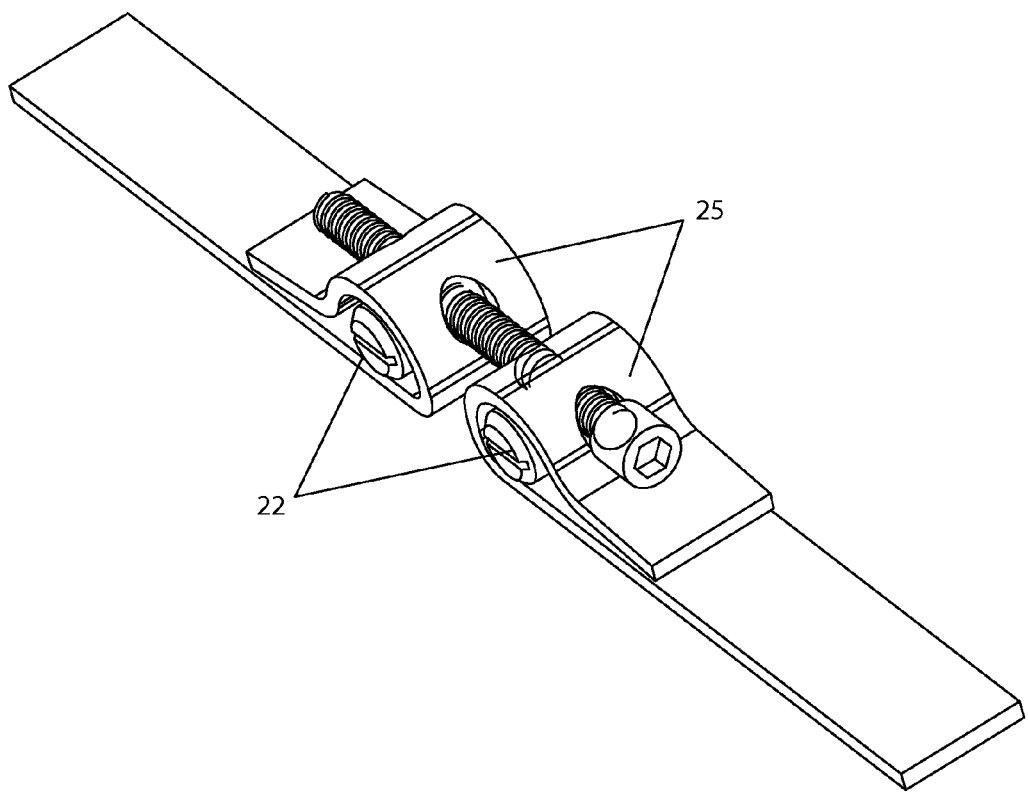
FIG. 14 is a perspective view of one preferred method for tensioning the cover bands.
Figure 15:
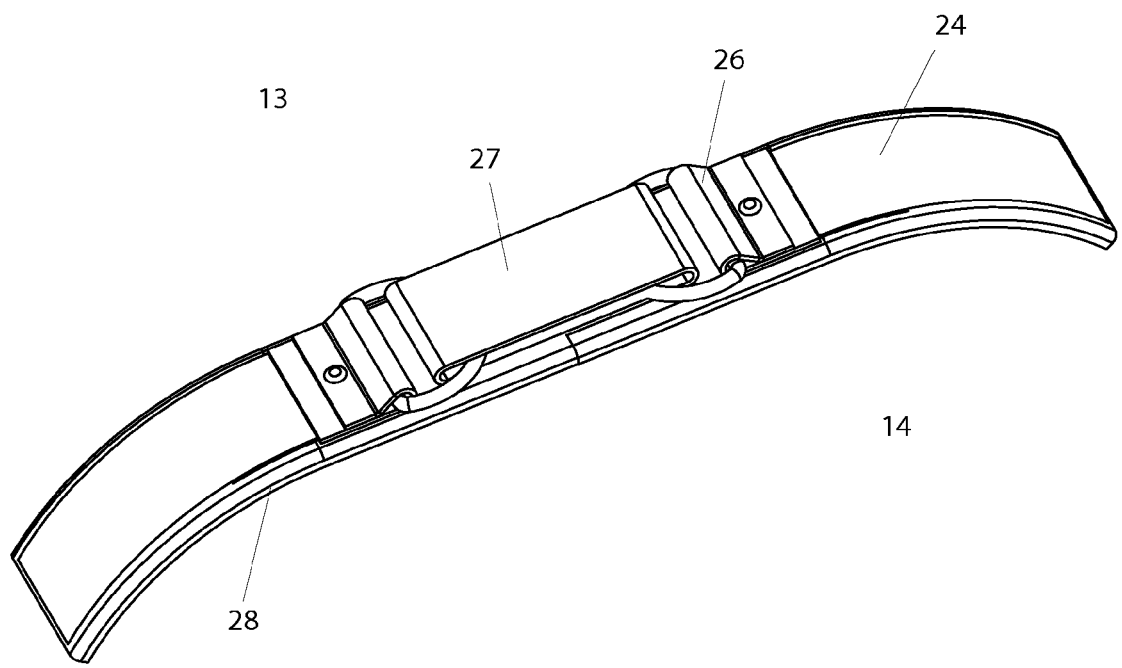
FIG. 15 is a perspective view of another preferred method for tensioning the cover bands.

Referring now to FIG. 12, a pickup topper embodiment is shown partially assembled. FIG. 13 shows the cover fully assembled with compression bands 31 commonly attached to the corner fasteners 23 and further secured in the center of the lid by either a mechanical connection 25, as shown in FIG. 14, or with an elastomeric connection as shown in FIG. 15. The compression bands 31 ensure that the cover has a weather proof connection to the end walls at highways speeds.

Figure 16:
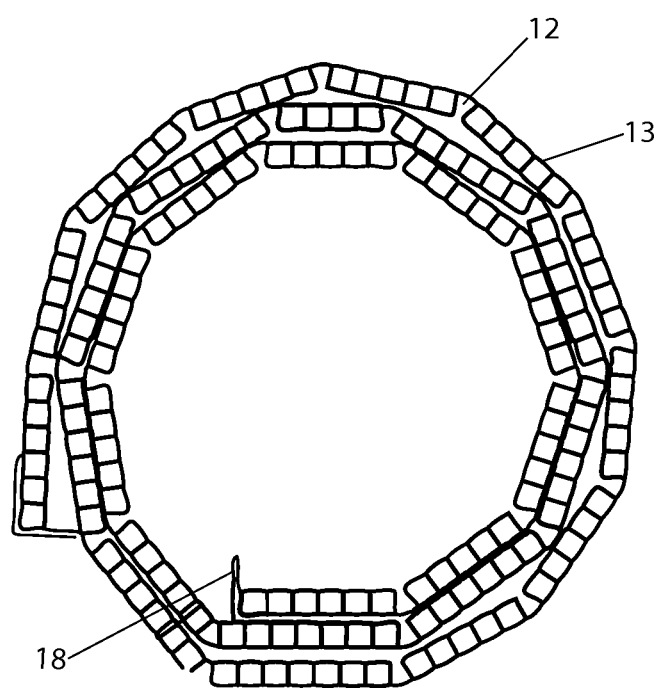
FIG. 16 is a perspective view of one preferred method to compactly ship and store the cover of the invention.

Referring now to FIG. 16, the cover as shown in FIG. 15 is shown in a knocked down or collapsed profile. This makes the product design highly advantageous for shipping or storing and also demonstrates how the structure cover can be rolled into a compact shape.

Figure 17:
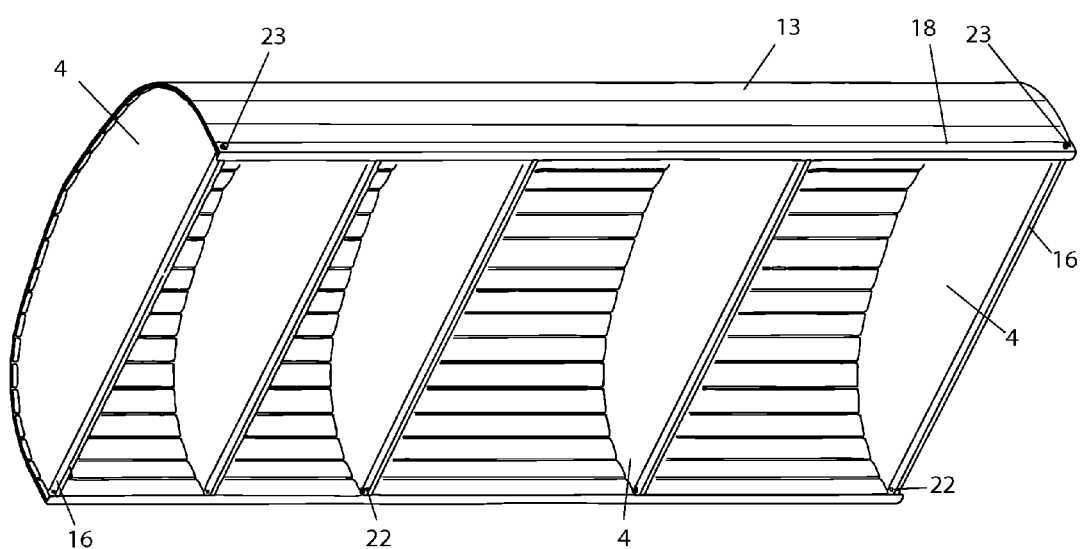
FIG. 17 is a frontal view of the structure used as a point of sale display with additional end walls fitted for shelving.

Referring to FIG. 17, this shows how the structure can be rendered as a novel display and/or shelving unit with multiple shelf locations.

Figure 18:
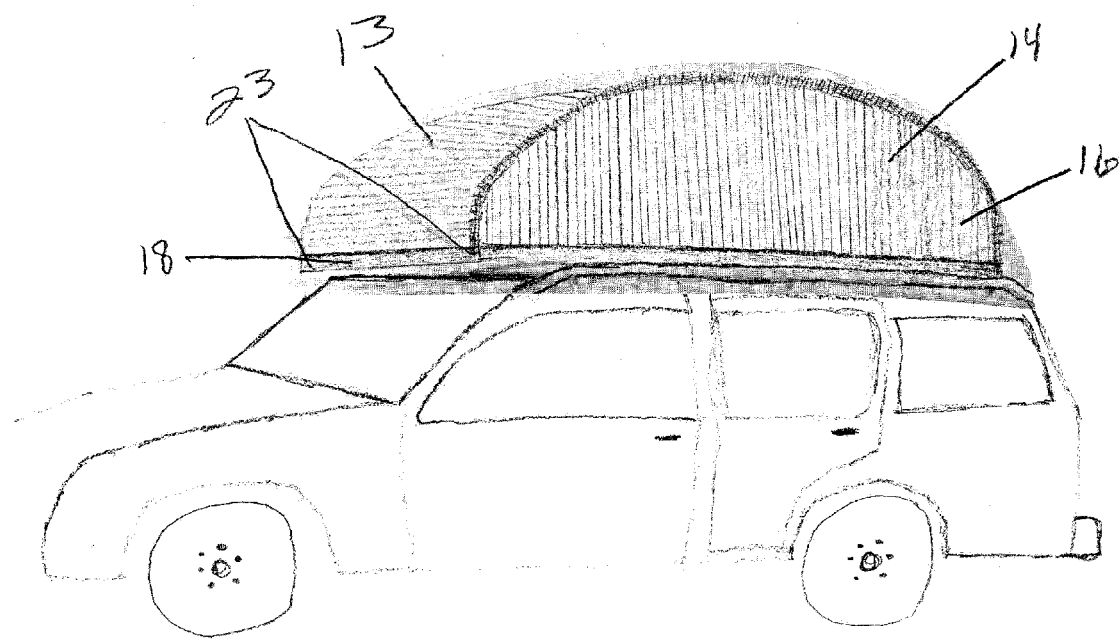
FIG. 18 is a side view of the structure when rendered as a car top enclosure with the end walls cut in an aerodynamic shape for the cover to conform too.

Referring to FIG. 18, this shows a roof top version of the cover with the end walls 14 defining the aerodynamic shape of the cover 13, with the end walls 14 profiled in a longitudinal orientation.

Figure 19:
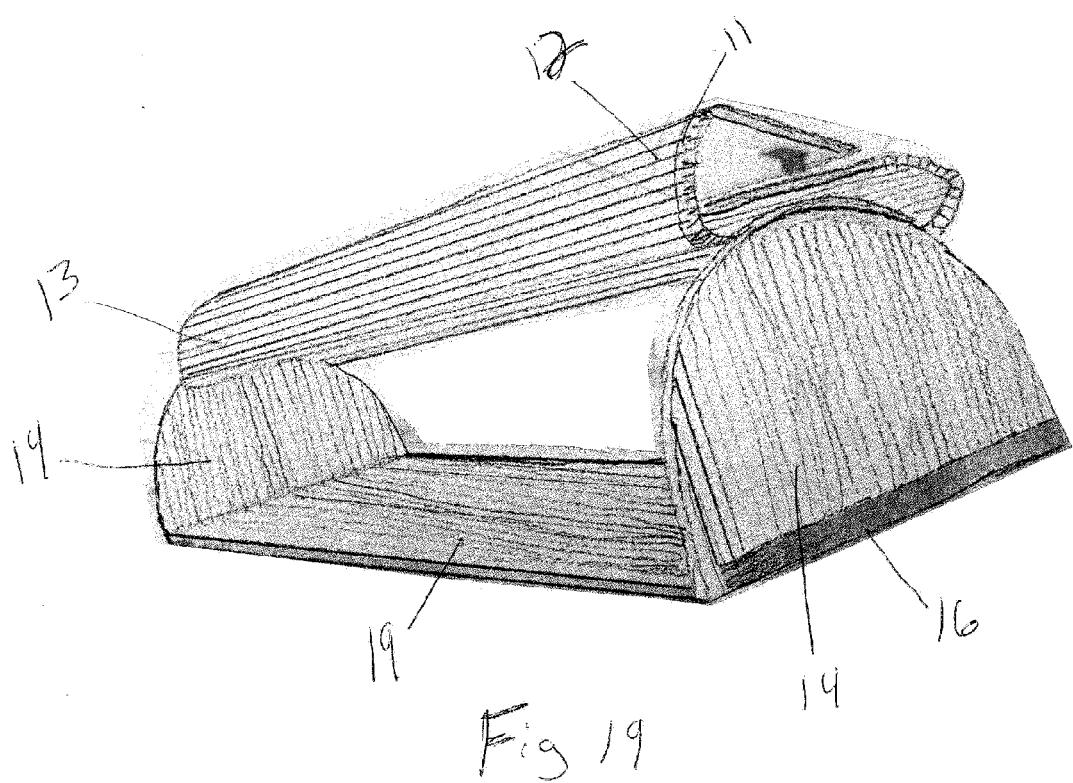
FIG. 19 is an elevated side view of the structure used as a cargo box that opens from either side.

FIG. 19 shows a version of the invention with access available from either side of the box because of the unique folding and rolling ability of the invention.

Figure 20:
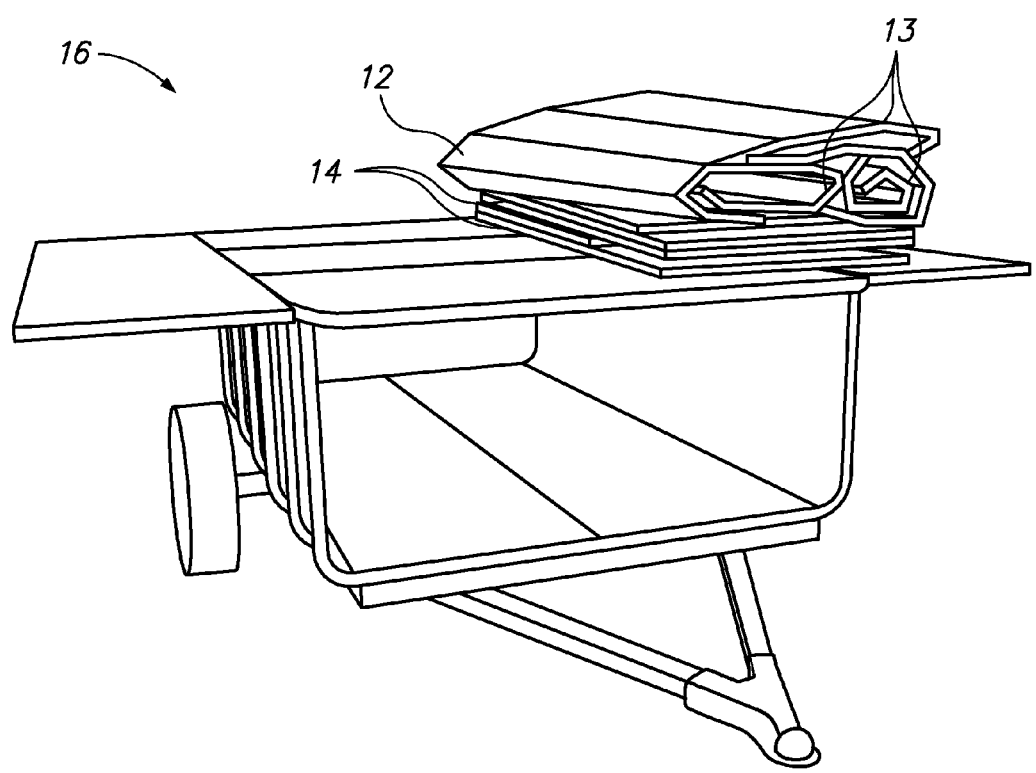
FIG. 20 is a perspective view of the large format version of the arch design knocked down for shipping.
Figure 21:
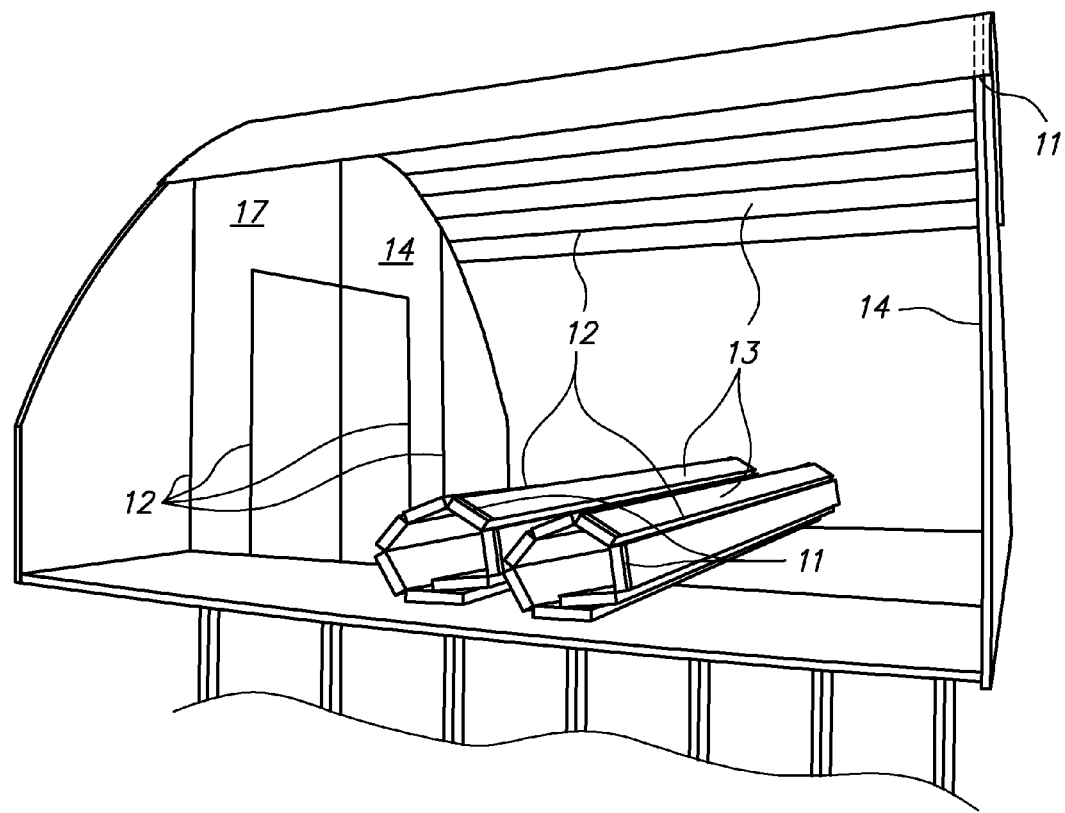
FIG. 21 is a perspective view of the large format arch design partially assembled.
Figure 22:
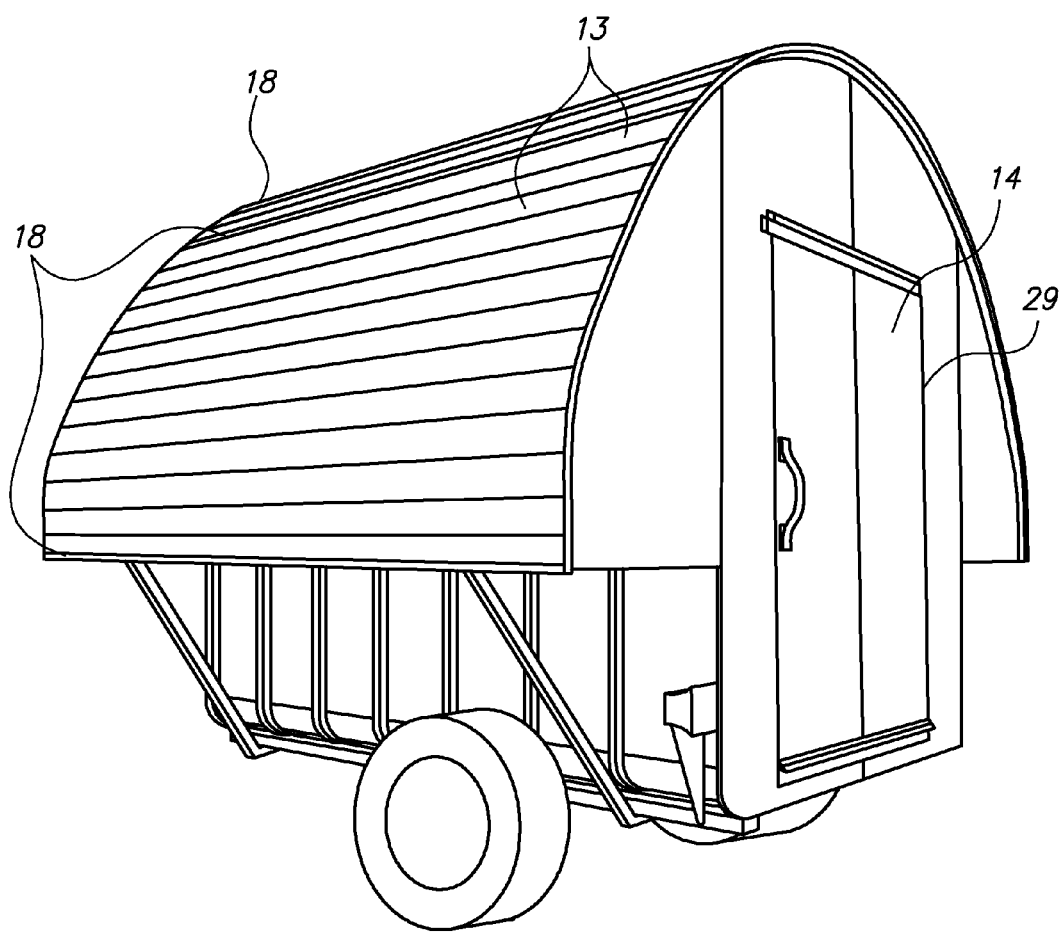
FIG. 22 is a side view of the large format version of the arch design for use with a utility trailer, fully assembled into a shelter with integrated hinging door.

FIG. 20 show a large format version of the invention in knock down view with three cover sections 13 rolled into shipping profile and two end walls 14 folded into shipping profile. FIG. 21 shows the large format structure partially assembled with one of the three cover 13 panels in place and both end walls 14 locked into the covers 13 groove 11. The end walls 14 have places where material has been removed 12 that allow the large format end walls to be folded for storage and shipping.

FIG. 21 shows the large format structure fully assembled with the three roof panels 13 connected using common hardware and locked onto the end walls 14 with one end wall providing a hinged door created by removing material 29 from three sides of the panel along the door perimeter.

The advantages of the structure include, without limitation, that it is portable and exceedingly easy to transport. That the structure has unique folding and rolling abilities that greatly reduce the cubic space necessary to ship or store the structure. That among these folding advantages is the ability to create hinged openings in the cover or end walls of the structures through the process of removing material from the rigid sheet. It is easy to move these structures when assembled because they are relatively lightweight and rigid. The present structure has unique mechanical and aerodynamic characteristics that make it robust in windy conditions or under heavy weighting from snow loads.

The method of creating the structure is unique to the structural design. The creation of channels in the semi-rigid material to make the material flexible yet strong when incorporated with the end panels, or end walls, is new and creative.

In broad embodiment, the present invention includes a structure and the method of creating that structure.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A structure comprising:
   a cover component made from
      a lightweight, semi-rigid material having an outside surface, an inside surface, a corrugated center portion, between said outside surface and said inside surface, a first end, a second end opposite said first end, and third and fourth ends perpendicular to said first and second ends, wherein said corrugated center portion and said inside surface of said cover component are cut from said first end to said second end to form at least one slit to facilitate bending of said cover component;
   at least one end wall component;
   at least one corner connection means; where
   said cover component has at least one channel cut therein extending from said third end through said middle portion to said fourth end and where said end wall component is inserted into said at least one channel from said third end through said middle portion and to said fourth end so that said cover component wraps around said end wall component thereby forming said structure; and said at least one corner connection means connects and secures said cover component to said end wall component at said third end and at said fourth end.

2. The structure of claim 1 where said end wall component is also made from said double walled, corrugated, lightweight material.

3. The structure of claim 2 where said double walled, corrugated material is polypropylene.

4. The structure of claim 1 where said corner connection uses a canting barrel nut assembly, or PIN NUT fastener to secure said components to one another.

5. The structure of claim 1 further having at least one hinged opening created in said double walled, corrugated sheet by removing all but one surface from the sheet, thereby allowing for the creation of doors, windows, vents and openings therein.

6. The structure of claim 1 where said structure is a truck or trailer cover.

7. The structure of claim 1 where said structure includes lighting, heating or cooling elements inserted therein.

8. The structure of claim 1 where said double walled, corrugated material has varying degrees of transparency.

9. The structure of claim 1 where said structure has additional space containing air that enhances an insulating value of said structure.

10. The structure of claim 1 where said double walled, corrugated material has at least one compression band that is common attached to said end wall connector means that secures a perimeter of said cover component to a top surface of said end wall component.

11. A method of creating a structure, comprising:
taking a sheet of semi-rigid cover material with an inside surface, an outside surface, a corrugated center portion between said outside surface and said inside surface, a first end, a second end opposite said first end, and third and fourth ends perpendicular to said first and second ends;
cutting said corrugated center portion and said inside surface of said cover material from said first end to said second end thereby forming at least one slit therein to facilitate bending of said cover material;
forming a channel in at least said inside surface of said cover material from a said third end through a middle portion and to said fourth end of said cover material;
connecting said cover material to at least one end wall by inserting an outer edge of said end wall into said channel of said cover material; and
securing said cover material to at least one end with a corner connection means at both said third end and at said fourth end.

12. The method of claim 11 where said connection means uses a canting barrel nut assembly, or PIN NUT and bolt assembly.

13. A structure comprising:
a cover component made from
a lightweight, semi-rigid material having an outside surface, an inside surface, a corrugated center portion between said outside surface and said inside surface, a first end, a second end opposite said first end, and third and fourth ends perpendicular to said first and second ends,
wherein said corrugated center portion and said inside surface of said cover component are cut from said first end to said second end to form at least one slit to facilitate bending of said cover component;
at least one end wall component made from said corrugated, lightweight material that has a flat bottom edge having a first bottom end and a second bottom end, a first side, and a second side, wherein said first side and said first bottom end meet to form a first corner and said second side and said second bottom end meet to form a second corner;
at least one corner connection means; where
said cover component has at least one channel cut therein and extending from said third end, through a middle portion to said fourth end and where said end wall is inserted into said at least one channel from said third end, through said middle portion to said fourth end so that said cover component wraps around said end wall thereby forming a structure; and
said at least one corner connection means connects and secures said third end and said fourth end of said cover component to said end wall component at said first corner and said second corner.

14. The structure of claim 13 where said connection means utilizes a PIN NUT, or canting barrel nut assembly.

15. The structure of claim 13 where said double walled, corrugated material has at least one compression band that is common attached to said end wall connector means that secures a perimeter of said cover to said top edge of said end wall.

16. The structure of claim 13 further having at least one hinged opening created in said sheet by removing all but one surface from the sheet, thereby allowing for the creation of doors, windows, vents and openings therein.

17. The structure of claim 13 where said structure is a truck or trailer cover.

18. The structure of claim 13 where said structure includes lighting, heating or cooling elements inserted therein.

19. The structure of claim 13 where said double walled, corrugated material has varying degrees of transparency.

* * * * *